US012752917B2

(12) United States Patent
Hertzberg

(10) Patent No.: US 12,752,917 B2
(45) Date of Patent: Oct. 6, 2026

(54) UNMANNED AERIAL VEHICLE (UAV) PEST ABATEMENT DEVICE

(71) Applicant: Harrison Francis Hertzberg, Spirit Lake, ID (US)

(72) Inventor: Harrison Francis Hertzberg, Spirit Lake, ID (US)

( * ) Notice: Subject to any disclaimer, the term of this patent is extended or adjusted under 35 U.S.C. 154(b) by 1032 days.

(21) Appl. No.: 17/418,806

(22) PCT Filed: Dec. 27, 2019

(86) PCT No.: PCT/US2019/068732

§ 371 (c)(1),
(2) Date: Jun. 26, 2021

(87) PCT Pub. No.: WO2020/140027

PCT Pub. Date: Jul. 2, 2020

(65) Prior Publication Data

US 2022/0073205 A1 Mar. 10, 2022

Related U.S. Application Data

(60) Provisional application No. 62/917,737, filed on Dec. 28, 2018.

(51) Int. Cl.

| | |
|---|---|
| ***B64D 1/18*** | (2006.01) |
| ***A01M 7/00*** | (2006.01) |
| ***B05B 13/00*** | (2006.01) |
| *B64U 101/45* | (2023.01) |

(52) U.S. Cl.

CPC ............... *B64D 1/18* (2013.01); *A01M 7/006* (2013.01); *A01M 7/0089* (2013.01); *B05B 13/005* (2013.01); *B64U 2101/45* (2023.01)

(58) Field of Classification Search

CPC ....... B64D 1/18; A01M 7/006; A01M 7/0089; B64U 2101/45; B05B 1/20; B05B 13/005

USPC .......................................................... 239/159

See application file for complete search history.

(56) References Cited

U.S. PATENT DOCUMENTS

| | | | |
|---|---|---|---|
| 3,748,383 A * | 7/1973 | Grossman | H04N 23/20 348/E5.09 |
| 9,381,646 B1 | 7/2016 | Fryshman | |
| 9,382,003 B2 | 7/2016 | Burema et al. | |
| 10,011,352 B1 * | 7/2018 | Dahlstrom | B64U 10/60 |

(Continued)

FOREIGN PATENT DOCUMENTS

| | | |
|---|---|---|
| CN | 101979276 | 2/2011 |
| CN | 205239915 | 5/2016 |

(Continued)

OTHER PUBLICATIONS

PCT, Notification of Transmittal of the International Search Report and Written Opinion, International Searching Authority, Jun. 10, 2020, 44 pages.

(Continued)

*Primary Examiner* — Jason J Boeckmann

(74) *Attorney, Agent, or Firm* — Dicke, Billig & Czaja, PLLC

(57) ABSTRACT

An unmanned aerial vehicle (UAV) includes a carrier body, which supports at least one propulsion element, and at least one reservoir and a spraying arrangement including at least one arm to extend outward from the carrier body and at least one nozzle to spray pest abatement material.

15 Claims, 15 Drawing Sheets

(56) References Cited

U.S. PATENT DOCUMENTS

| | | | | |
|---|---|---|---|---|
| 11,498,090 | B2 * | 11/2022 | Thompson | B05B 15/534 |
| 2008/0302884 | A1 | 12/2008 | Petersen | |
| 2009/0002493 | A1 * | 1/2009 | Kates | A01M 31/002<br>348/155 |
| 2015/0344136 | A1 * | 12/2015 | Dahlstrom | B64U 50/19<br>239/722 |
| 2017/0231213 | A1 | 8/2017 | Gordon et al. | |
| 2018/0354624 | A1 | 12/2018 | Liu | |
| 2021/0379617 | A1 * | 12/2021 | Chapple | B64D 1/18 |

FOREIGN PATENT DOCUMENTS

| | | |
|---|---|---|
| ES | 2608903 | 12/2017 |
| WO | 2014160589 | 10/2014 |
| WO | 2016138604 | 9/2016 |
| WO | 2017134659 | 8/2017 |
| WO | 2020095884 | 5/2020 |

OTHER PUBLICATIONS

Rooney, New drone aims to take out Europe's killer-hornets, CNBC, Jun. 16, 2016, 4 pages; available from https://www.cnbc.com/2016/06/16/new-drone-aims-to-take-out-europes-killer-hornets.html.

Fitostinger, Drones PhytoStinger, Fitostinger, 7 pages; available at least as early as Apr. 12, 2022 at https://www.fitostinger.com/en/control-de-plagas-con-tecnologia-drone/fitostinger-nuestros-drones/#fitostinger.

* cited by examiner

UNMANNED AERIAL VEHICLE (UAV) PEST ABATEMENT DEVICE

CROSS REFERENCE TO RELATED APPLICATION

This Utility Patent Application is a National Stage filing via, and claims priority under, 35 U.S.C. § 371 to International Application Serial No. PCT/US2019/068732, filed Dec. 27, 2019, which claims the benefit of U.S Patent Provisional Application Ser. No. 62/917,737 filed Dec. 28, 2018, all of which are incorporated herein by reference.

BACKGROUND

Unmanned Aerial Vehicle (UAV) shows in many fields. One such field includes spraying liquids and/or other materials for various purposes.

BRIEF DESCRIPTION OF THE DRAWINGS

FIG. 8B represents a conduit linking the spraying nozzle and reservoir.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

An aerial drone which includes a pest abatement system. A remote operator deploys the drone and controls the drone and abatement system with one or more transmitters. The drone flies to the pest environment then the pest operator uses the transmitter to control the drone and pest abatement system to abate the pests from a remote location. The pest abatement system may utilize, but is not limited to, a means of deploying liquid, foam, solid, gas (fog or vapor), or a combination thereof to abate the pests in the pest containing environment. The means of pest abatement may include, but are not limited to, sprays, vacuums, foggers, baits, granules, or traps to deliver the previously mentioned types and forms of poison, insecticide, pesticide, or other means of pest abatement.

At least some of the examples are directed to providing pest abatement in hard to reach places. In some examples the UAV pest abatement device includes an electric pump and a battery, with some examples, including a propellant tank acting as a method to spray pest abatement material. The spraying arrangement includes an arm to extend outward from the carrier body with at least one point of articulation, and at least one reservoir to store pest abatement material, and one nozzle to spray pest abatement material. In one example application the articulation of the outward extending arm in conjunction with the nozzle allows for precision spraying.

In general terms, in some examples, pest abatement is applied through spraying pest abatement material directly onto the pest or habitation (e.g., a nest or hive) from the nozzle of the UAV pest abatement device. The pest abatement material can take a varying amount of time to exterminate the pests based on the specific kind of pest and the specific kind of pest abatement material. Generally the pest abatement material will be left upon the pest or habitation overnight in order for the abatement process to properly abate the habitation. In one example application the UAV pest abatement method utilizes the propulsion method (e.g., propellers) to remove the pest habitation from a structure or dwelling.

Figure 1:
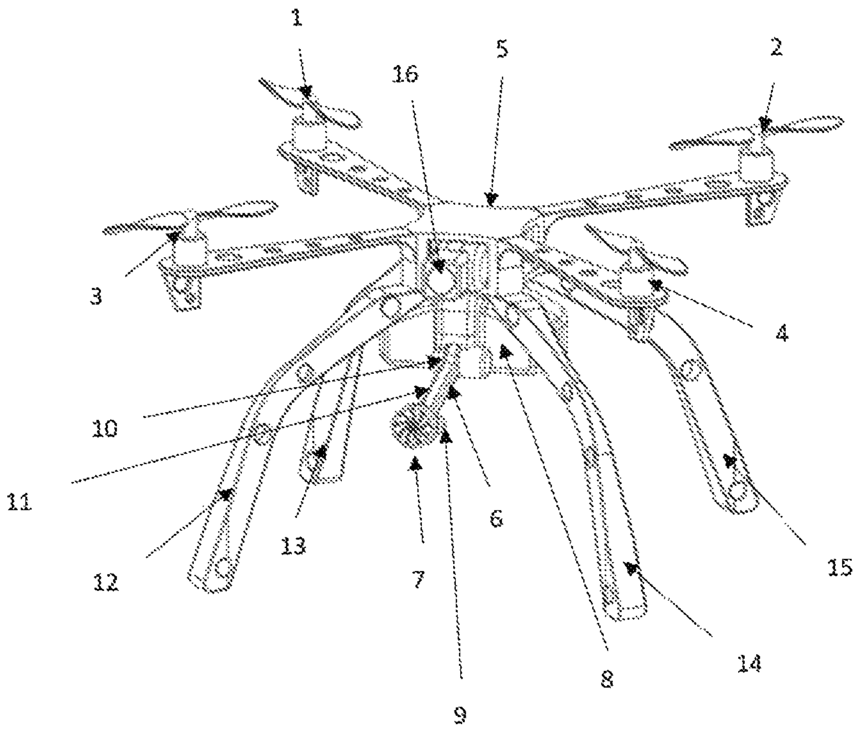
FIG. 1 is a diagram including a perspective view schematically illustrating an example UAV pest abatement device.

FIG. 1 is a diagram schematically illustrating, in one example of the present disclosure, a UAV pest abatement device. The spraying arrangement 11 shows a forward facing nozzle 7 and a reservoir 8 to store pest abatement material.

FIG. 1 shows a reservoir 8 that is connected underneath the carrier body 5. FIG. 1 shows an articulating arm 6 that has two points of articulation one point of articulation 10 where the arm mechanically connects to the carrier body 5 and another point of articulation towards the center of the arm 9. FIG. 1 shows a standard UAV device with propellers 1 2 3 4 as the method of propulsion. FIG. 1 shows a camera 16 that provides visual cues for the UAV pest abatement device. FIG. 1 shows landing gear 12 13 14 15 as a method for landing the UAV pest abatement device on flat surfaces without risking the integrity of the UAV pest abatement device or any of its individual pieces.

In some examples, pest abatement for the UAV pest abatement device is provided by multiple nozzles per spraying arrangement. Having more than one nozzle increases the volume of pest abatement material sprayed by the UAV pest abatement device.

In some examples, pest abatement for the UAV pest abatement device is provided by unique alternating spray nozzles. A mechanical motor switches nozzles on the spraying arrangement. Unique alternating nozzles change the method of spraying providing versatility to abate different pests and pest habitations in varying conditions. Alternating unique nozzles by transmitter or manually allows for efficient change between unique nozzles.

Figure 8A:
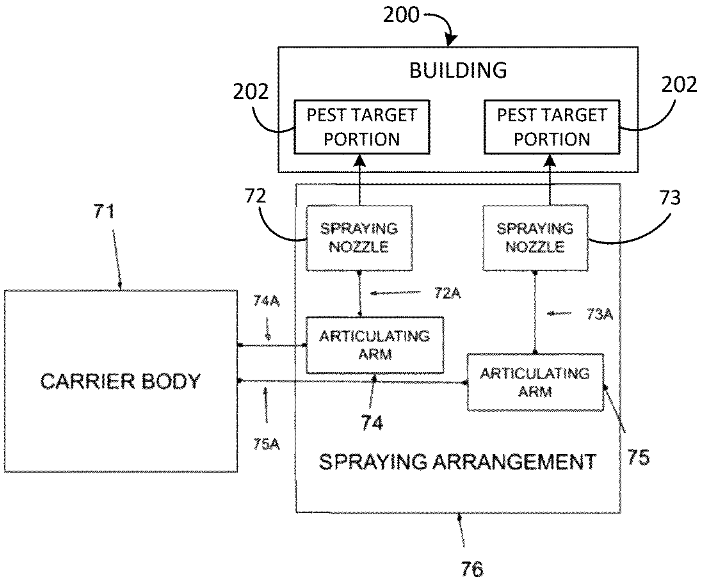
FIG. 8A is a block diagram schematically representing an example UAV pest abatement device including a spraying arrangement comprising two articulating arms each fitted with a nozzle.
Figure 8B:
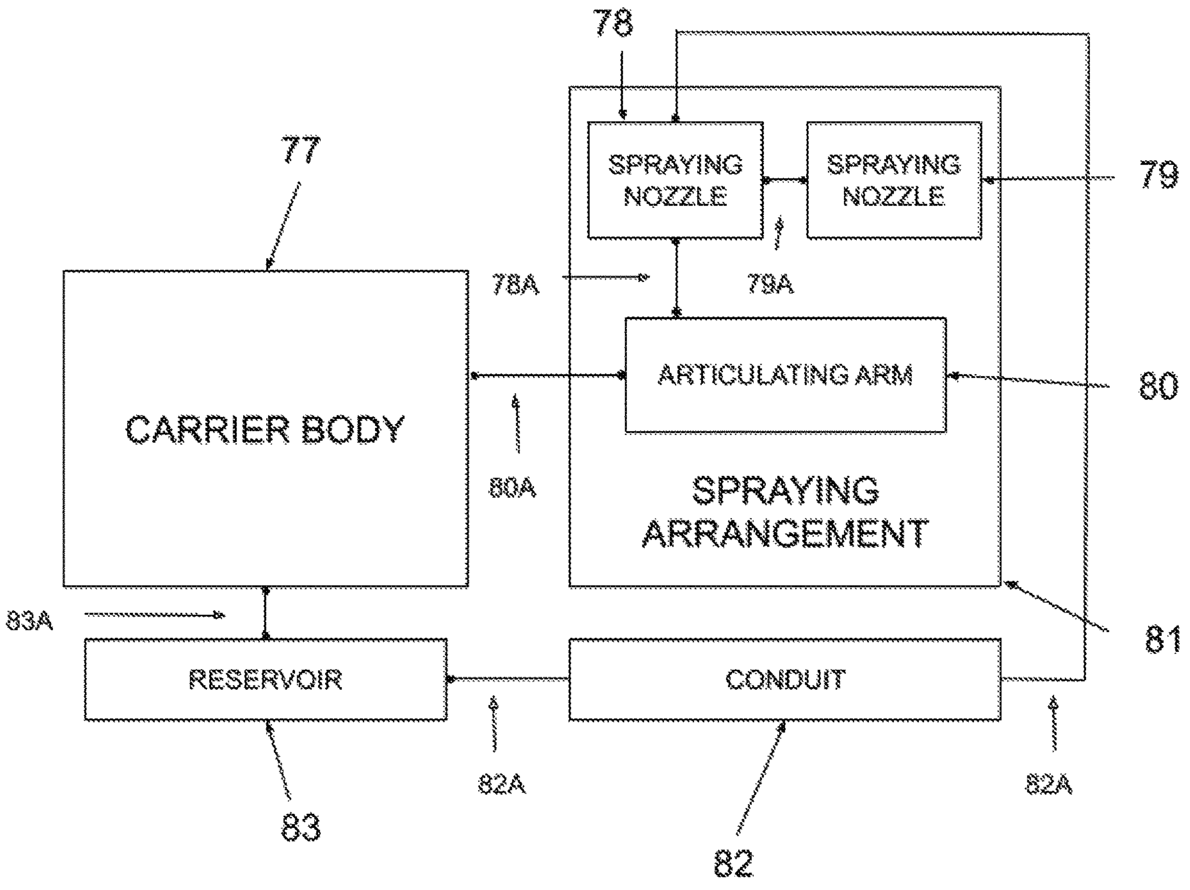
FIG. 8B is a block diagram schematically representing an example UAV pest abatement device including a spraying arrangement comprising an articulating arm fixed with two interchangeable nozzles.

These examples, and additional examples are described throughout the present disclosure and in association with at least FIG. 8.

In some examples, pest abatement for the UAV pest abatement device is provided by multiple articulating arms per spraying arrangement. Increasing the number of arms and nozzles on the UAV pest abatement device improves dexterity, efficiency, and output of pest abatement material.

In some examples, pest abatement for the UAV pest abatement device is additionally provided by a fogger. The UAV pest abatement device has access to otherwise unreachable positions. A fogger clears large areas of pests, traditionally used for mosquito control. A fogger deploys small particles of pest abating poison.

In some examples, pest abatement for the UAV pest abatement device is additionally provided by a vacuum. A vacuum extracts pests and places them in a storage vessel. A vacuum removes pests more quickly and effectively than other methods. A vacuum allows for pests to be captured and contained in an alive state. This allows for a clean and non-deadly approach to pest control, especially when dealing with non-harmful or endangered pests such as honey bees.

In some examples, pest abatement for the UAV pest abatement device is provided by a liquid reservoir, an electric pump, and a battery. The liquid reservoir acts as a storage device for the pest abatement material. The electric pump creates pressure to spray the pest abatement material. The battery provides power for the electric pump. The battery may or may not be one in the same as the battery by which the drone is powered.

In some examples, pest abatement for the UAV pest abatement device is provided by a propellant tank. The liquid reservoir provides a storage device for the pest abatement material. The propellant tank stores pressurized gas, which will be released to spray the pest abatement material through the nozzle.

In some examples, pest abatement for the UAV pest abatement device is provided by an extended arm that has selectable positions. The extended arm with selectable positions is adaptable and can reach into hard to reach places. Having an extended arm with selectable positions improves the ability to spray pest abatement material into small spaces or complex architectures. In one example application the extended arm with selectable positions can be operated manually and/or by a remote transmitter. An example of an extended arm with selectable positions has a telescoping design with a motor connected mechanically to move the telescoping pieces.

In some examples, pest abatement for the UAV pest abatement device is provided by a camera. Cameras provide vision for the operator of the UAV pest abatement device. In one aspect thermal cameras improve visibility for pests and habitations. Moreover cameras improve the accuracy of the nozzle for spraying pest abatement material.

In some examples, pest abatement for the UAV pest abatement device is provided by a sensor. Sensors provide alternatives to vision in detecting the environment around the UAV pest abatement device. Some examples of sensors are, but are not limited to, ultrasonic, infrared, and stereoscopic.

In some examples, pest abatement for the UAV pest abatement device is provided by a light. Lights increase visibility for the operator in dark crevices and low light areas. Lights improve the effectiveness of cameras.

In some examples, pest abatement for the UAV pest abatement device is provided by a transmitter. A transmitter controls both the spraying arrangement and the carrier body. Controlling both of these separate pieces simultaneously provides ease of use for the operator of the UAV pest abatement device and improves the efficiency of spraying pest abatement material.

In some examples, the UAV pest abatement device is counter weighted by an electric pump, and a battery. The electric pump and the battery do not vary in weight throughout the flight. Placing the electric pump and the battery at the back of the drone provides a counterweight to the forward facing arm. This positioning increases the mobility and saves the battery power of the UAV pest abatement device.

In some examples, pest abatement for the UAV pest abatement device is provided by a propellant tank. The propellant tank does not vary substantially in weight throughout the flight as it is filled with a low-weight gas. Placing the propellant at the back of the drone provides a counterweight to the forward facing arm. This positioning increases the mobility and saves the battery power of the UAV pest abatement device.

Figure 2:
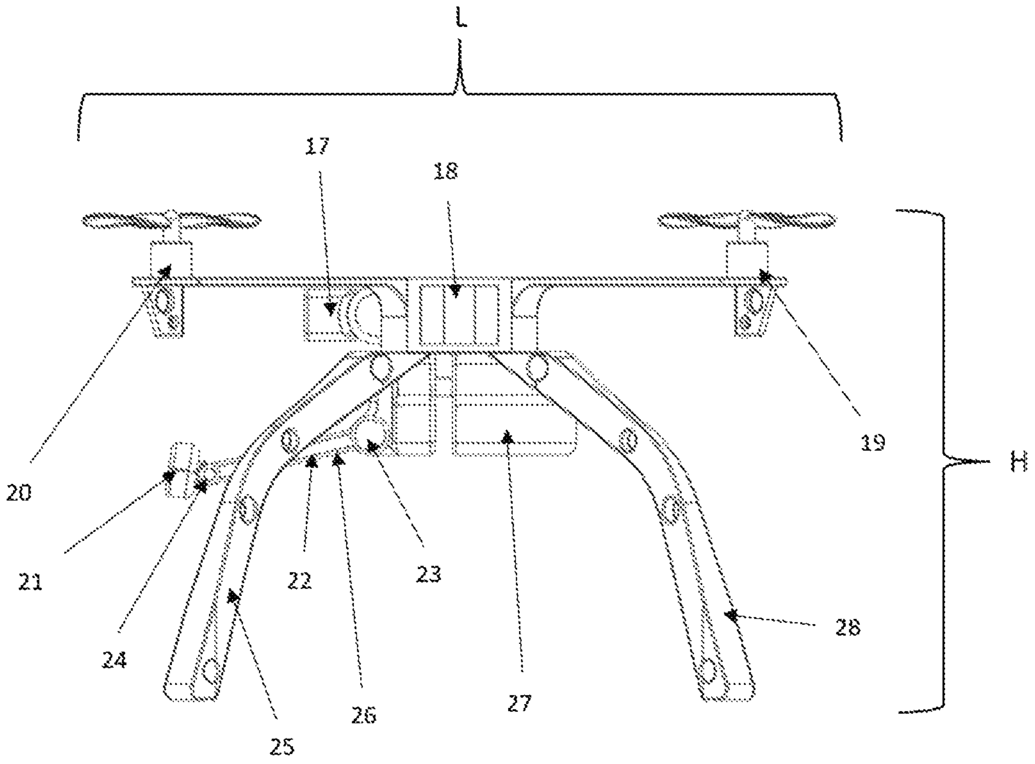
FIG. 2 is a diagram including a side view schematically illustrating an example UAV pest abatement device.

FIG. 2 is a diagram schematically illustrating, in one example of the present disclosure, a UAV pest abatement device. The spraying arrangement 26 shown shows a spray nozzle 21 and a reservoir 27 to store pest abatement material. FIG. 2 shows a reservoir 27 that is mechanically connected underneath the carrier body 18. FIG. 2 shows an articulating arm 22 that has two points of articulation, one point of articulation 23 attaching to the carrier body 18 and another point of articulation 24 towards the center of the articulating arm 22. FIG. 2 shows a standard UAV device with propellers 19 20 as the method of propulsion. FIG. 2 shows a light 17 that allows the illumination of pests in dark spaces. FIG. 1 shows landing gear 25 28 as a method for landing the UAV pest abatement device on flat surfaces without risking the integrity of the UAV pest abatement device or any of its individual pieces.

Figure 3:
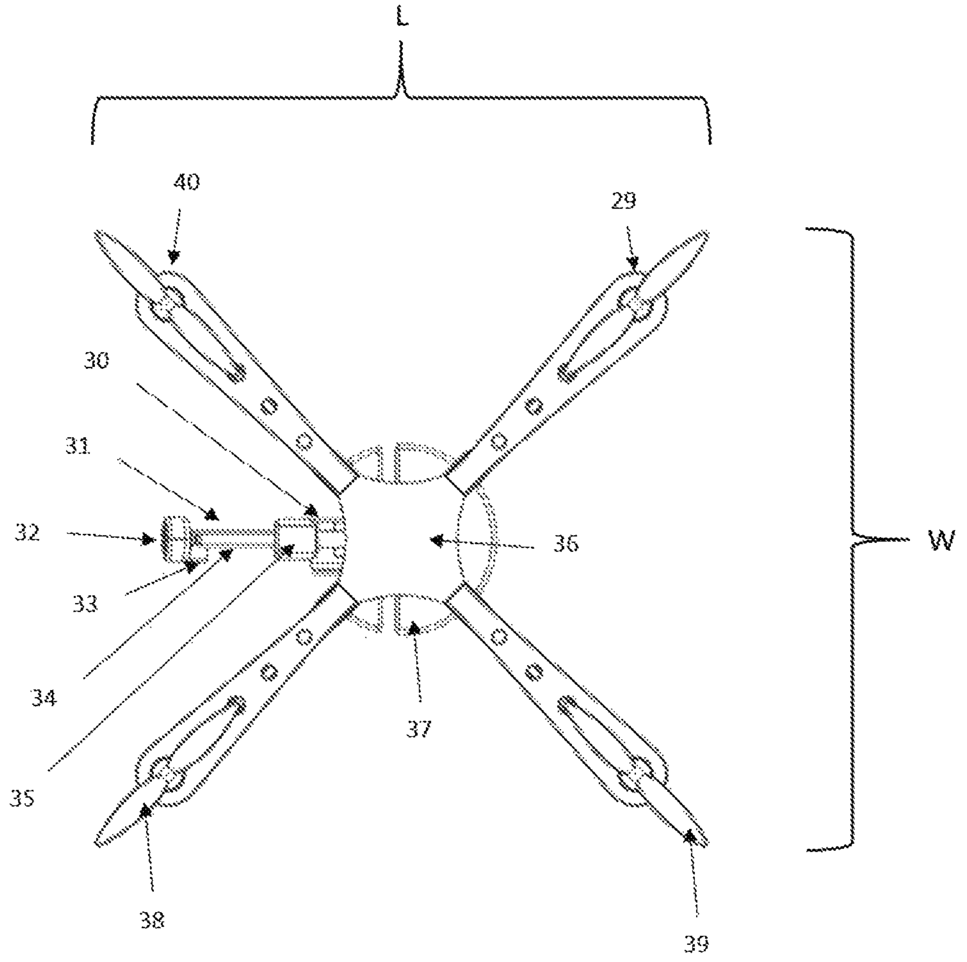
FIG. 3 is a diagram including a top view schematically illustrating an example UAV pest abatement device.

FIG. 3 is a diagram schematically illustrating, in one example of the present disclosure, a UAV pest abatement device. The spraying arrangement 31 shows a spray nozzle 32 and a reservoir 37 to store pest abatement material. FIG. 3 shows a reservoir 37 that is mechanically connected above the carrier body 36. FIG. 3 shows an articulating arm 34 to extend outward from the carrier body 36 that is more than a quarter of the width of the carrier body 36 that has two points of articulation, one point of articulation 35 attaching to the carrier body 36 and another point of articulation 33 towards the center of the articulating arm 34. FIG. 3 shows a standard UAV device with propellers 29 38 39 40 as the method of propulsion. FIG. 3 shows a sensor 30 that provides alternatives to vision in detecting around the UAV pest abatement device.

Figure 4:
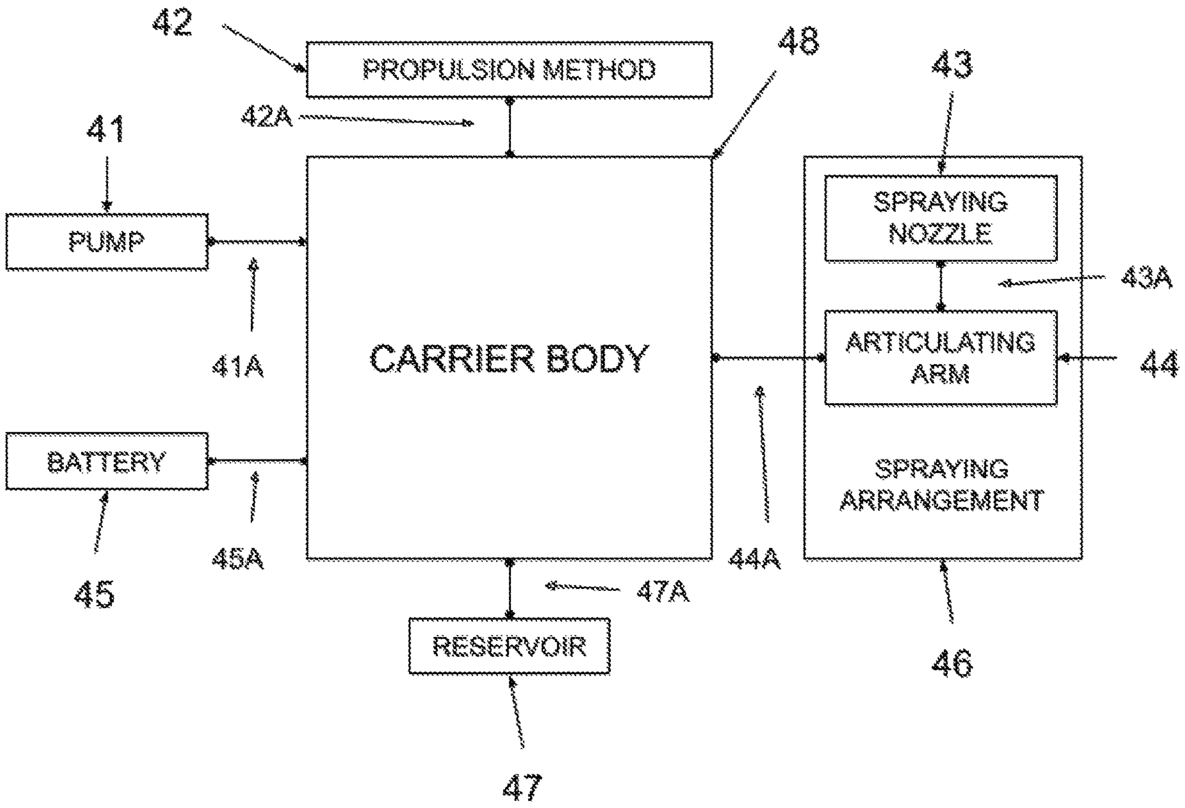
FIG. 4 is a block diagram schematically representing an example UAV pest abatement device including a spraying arrangement on an opposite side of the carrier body from a pump and a battery.
Figure 5:
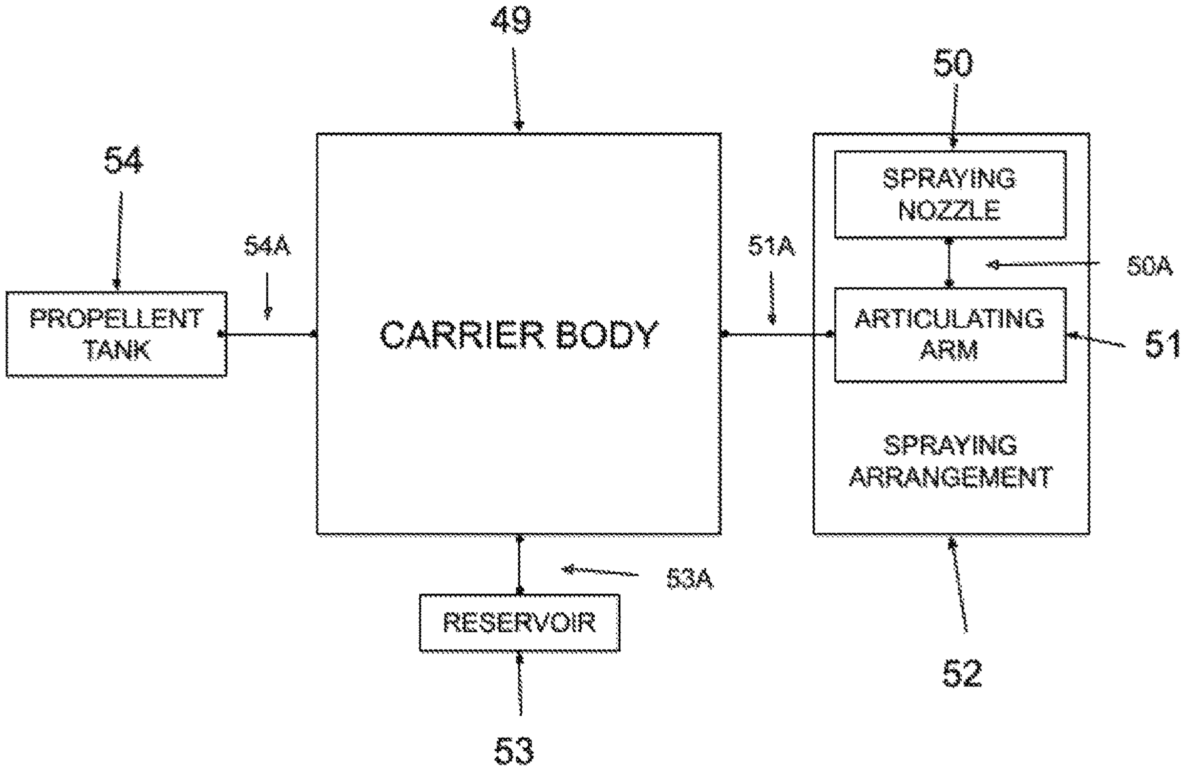
FIG. 5 is a block diagram schematically representing an example UAV pest abatement device including a spraying arrangement on an opposite side of the carrier body from a propellant tank.

FIG. 4 is a block diagram schematically illustrating a UAV pest abatement device for dispensing pest abatement material. This block diagram does not show the method of propulsion as a way to simplify the illustration, but it will be understood that such elements may be included. FIG. 4 shows a dynamic known as counterweight in order to display how the battery 45 and pump 41 can be stored in the back of the drone to create an equilibrium, towards the center of the carrier body 48. Creating this equilibrium allows for optimum energy usage and will wear down parts of the carrier body 48 more evenly. The reservoir is in the center of the block diagram to display that the weight should be placed at the center of the carrier body 48 due to the variability of the weight. When the UAV pest abatement device releases the pest abatement material the UAV pest abatement device will weigh differently due to this variability the reservoir 47 is placed in the center so that any weight change does not impact the equilibrium of the UAV pest abatement device. The reservoir 47 is placed below the carrier body 48 in order to show one embodiment of the UAV pest abatement device. In some examples, all links (e.g., 41*a*,42*a*,43*a*,44*a*,45*a*,47*a*) include electrical and/or mechanical connections and may in some cases include fluidic connections FIG. 5 is a block diagram schematically illustrating a UAV pest abatement device for dispensing pest abatement material. This block diagram does not show the method of propulsion as a way to simplify the illustration, but it will be understood that such elements may be included. FIG. 5 shows a dynamic known as counterweight in order to display how the propellant tank 54 can be stored in the back of the drone to create an equilibrium, towards the center of the drone. Creating this equilibrium allows for optimum energy usage and will wear down parts of the carrier body 49 more evenly. The reservoir 53 is in the center of the block diagram to display that the weight should be placed at the center of the carrier body 49 due to the variability of the weight. When the UAV pest abatement device releases the pest abatement material the entire device will weigh differently due to this variability the reservoir 53 is placed in the center so that any weight change does not impact the equilibrium of the UAV pest abatement device. The reservoir 53 is placed below the carrier body 49 n order to show one embodiment of the UAV pest abatement device. In some examples, all links (e.g. 50*a*, 51*a*,53*a*,54*a*) include electrical and/or mechanical connections and may in some cases include fluidic connections.

Figure 6A:
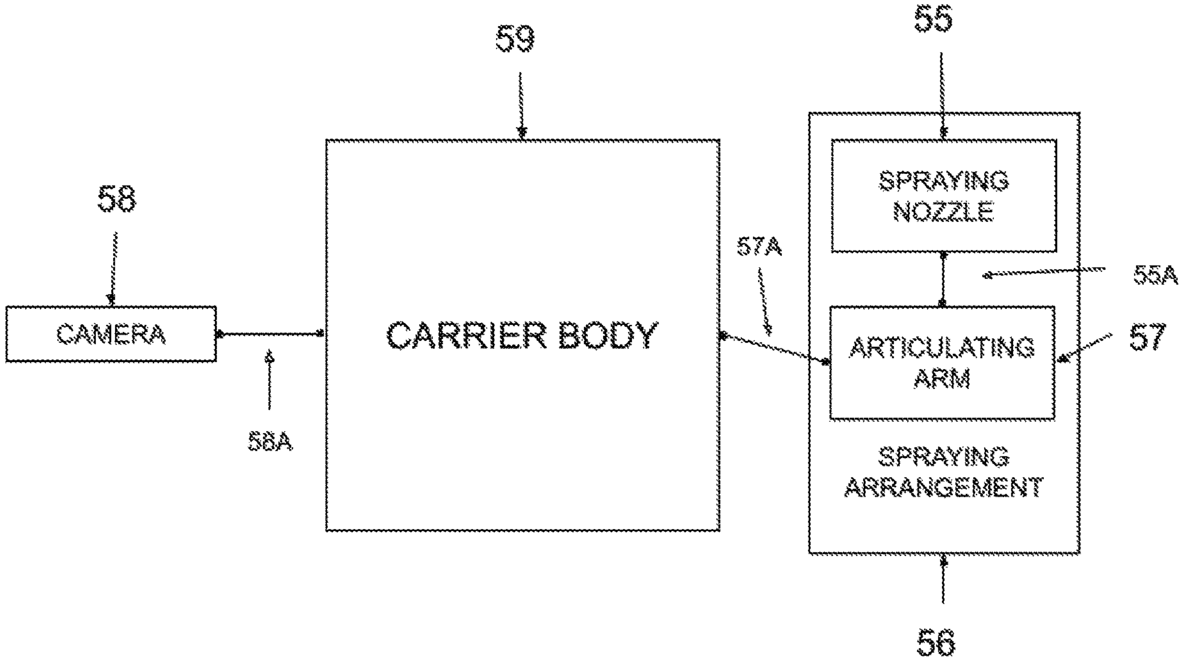
FIG. 6A is a block diagram schematically representing an example UAV pest abatement device including a camera fixed to the carrier body of the drone.

FIG. 6A is a block diagram schematically illustrating a UAV pest abatement device for dispensing pest abatement material. This block diagram does not show the method of propulsion and the reservoir as a way to simplify the illustration, but it will be understood that such elements may be included. FIG. 6A has a standard spraying arrangement 56 comprising an articulating arm 57 and a spray nozzle 55 connected to the carrier body 59. In some examples the camera is connected to the carrier body as shown in FIG. 6A. The camera provides additional visuals for the operator of the UAV pest abatement device. In some examples, all links (e.g. 55*a*,57*a*,58*a*) include electrical and/or mechanical connections and may in some cases include fluidic connections.

Figure 6B:
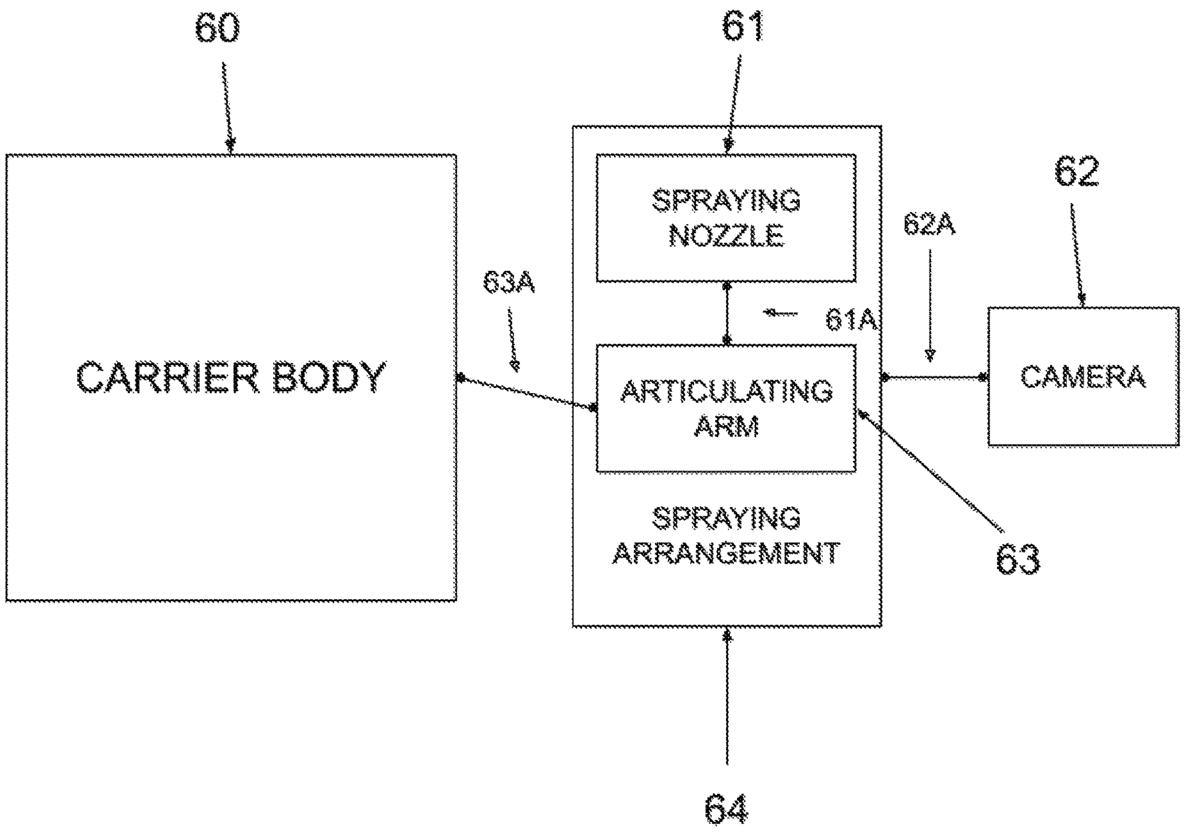
FIG. 6B is a block diagram schematically representing an example UAV pest abatement device including a camera fixed to the spraying arrangement.

FIG. 6B is a block diagram schematically illustrating a UAV pest abatement device for dispensing pest abatement material. This block diagram does not show the method of propulsion and the reservoir as a way to simplify the illustration, but it will be understood that such elements may be included. FIG. 6B has a standard spraying arrangement 64 comprising an articulating arm 63 and a spray nozzle 61 connected to the carrier body mechanically. In some examples the camera is connected to the spraying arrangement 60 as shown in FIG. 6B. The camera 62 provides additional visuals for the operator of the UAV pest abatement device. In some examples, all links (e.g. 61*a*,62*a*,63*a*) include electrical and/or mechanical connections and may in some cases include fluidic connections.

Figure 7:
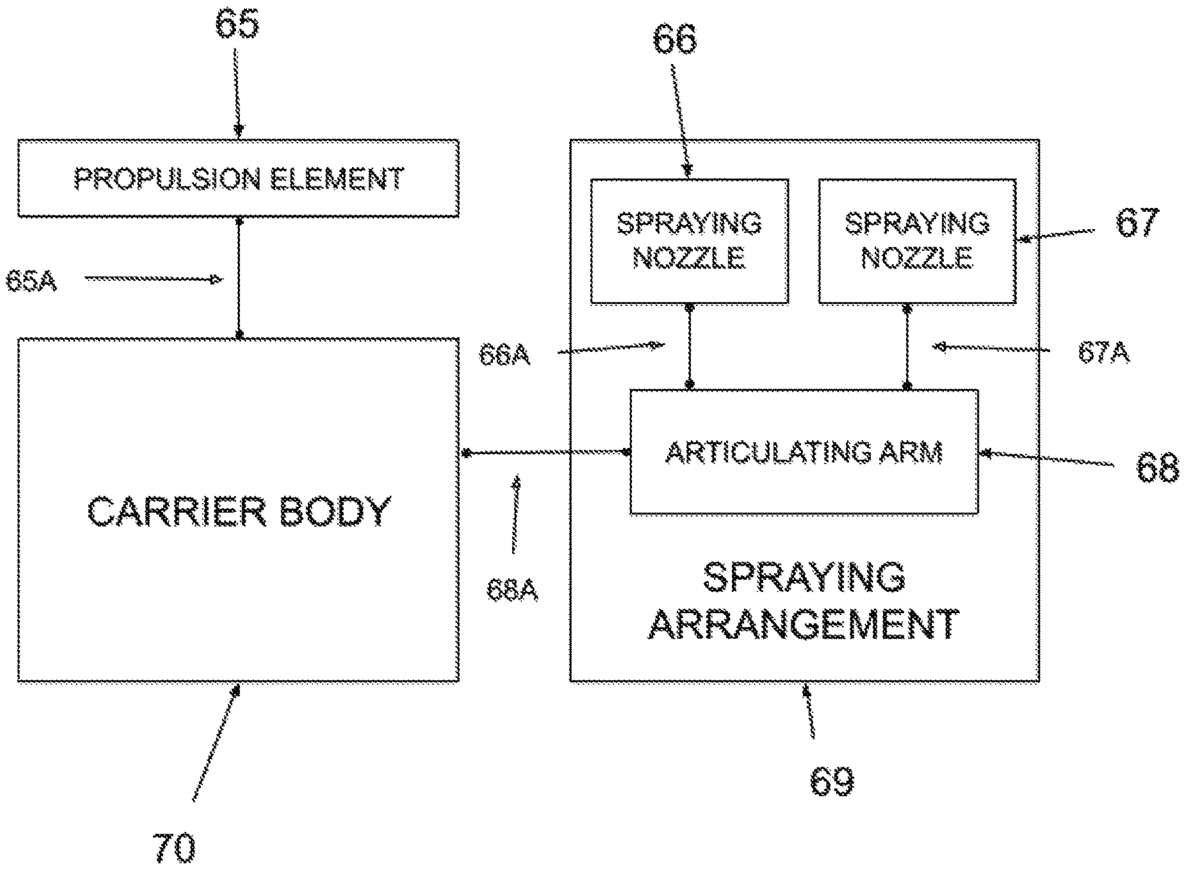
FIG. 7 is a block diagram schematically representing an example UAV pest abatement device including a spraying arrangement comprising an articulating arm with two fixed nozzles.

FIG. 7 is a block diagram schematically illustrating a UAV pest abatement device for dispensing pest abatement material. This block diagram does not show the reservoir as a way to simplify the illustration, but it will be understood that such elements may be included. FIG. 7 shows a slightly modified spraying arrangement 69. The spraying arrangement 69 has one articulating arm 68 with two nozzles 66 67 at the end. Having multiple spray nozzles increases the amount of pest abatement material that is sprayed at one time. In some examples, all links (e.g. 65*a*,66*a*,67*a*,68*a*) include electrical and/or mechanical connections and may in some cases include fluidic connections.

FIG. 8A is a block diagram schematically illustrating a UAV pest abatement device for dispensing pest abatement material. This block diagram does not show the reservoir as a way to simplify the illustration, but it will be understood that such elements may be included. FIG. 8A shows a slightly modified spraying arrangement 76. The spraying arrangement 76 has two articulating arms 74 75, with one spray nozzle each 72 73 at the end. This increases the amount of pest abatement material just as much as the model in FIG. 7 but additionally adds mobility to each individual arm. Two separate functioning articulate arms allows for spraying of multiple nests at once and from two separate positions. In some examples, all links (e.g. 72*a*, 73*a*, 74*a*, 75*a*) include electrical and/or mechanical connections and may in some cases include fluidic connections.

Figure 12:
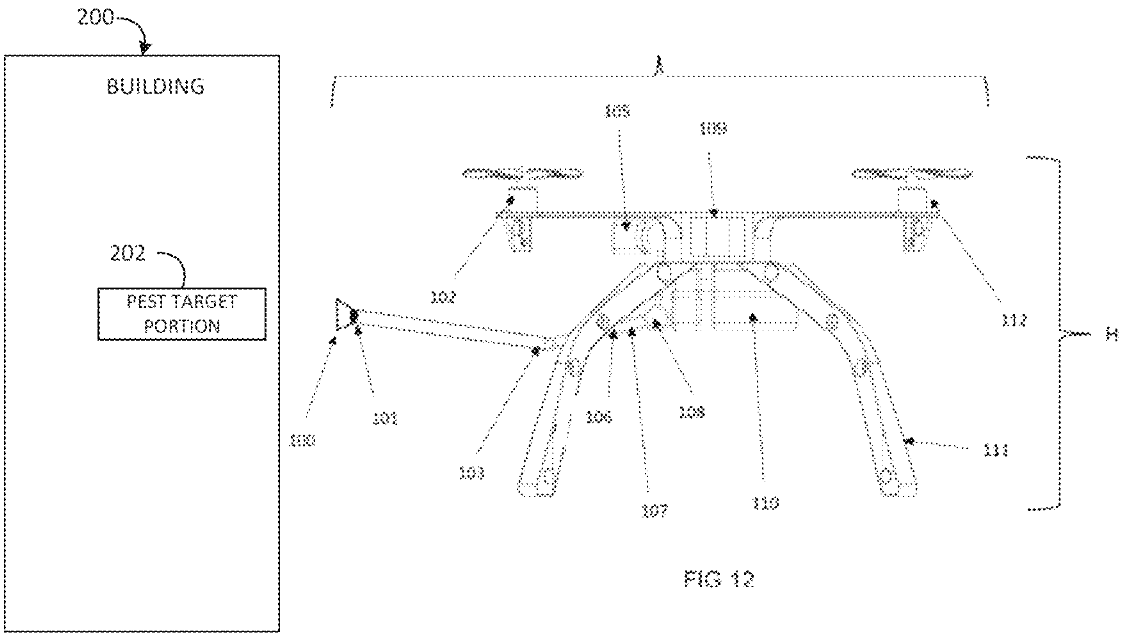
FIG. 12 is a diagram including a perspective view schematically illustrating an example UAV pest abatement device comprising a nozzle fixed to an extracted extendable armature.
Figure 14:
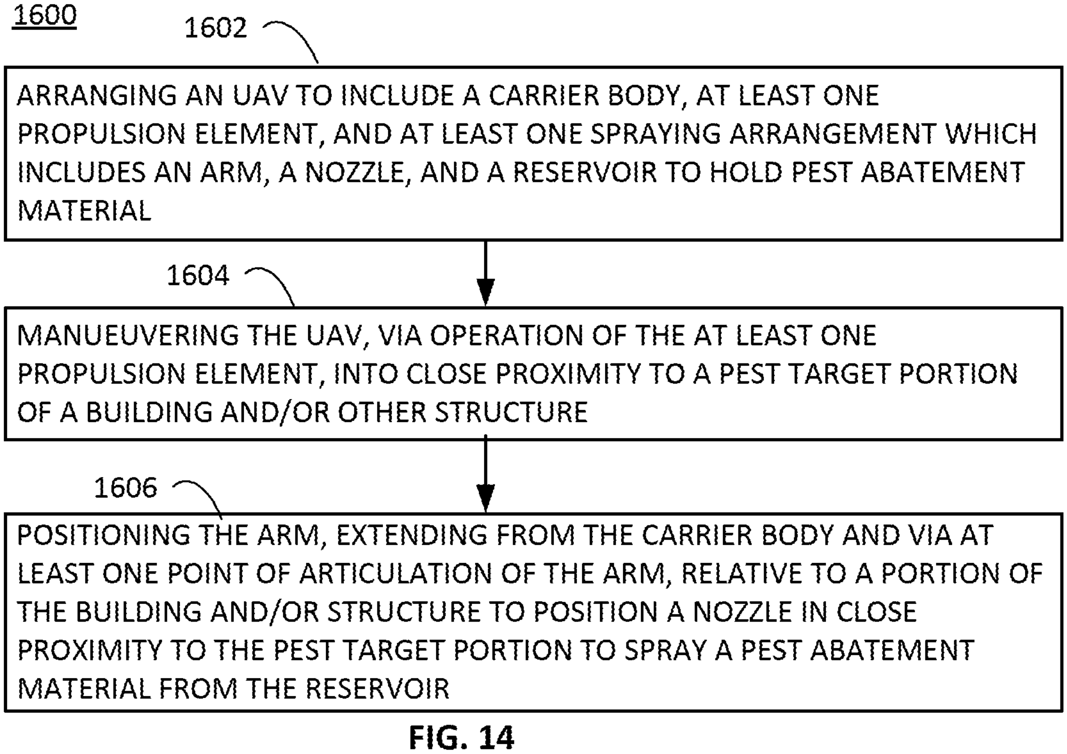
FIG. 14 is a flow diagram of an example method.

FIG. 8A is a block diagram schematically illustrating a UAV pest abatement device for dispensing pest abatement material. This block diagram does not show the reservoir as a way to simplify the illustration, but it will be understood that such elements may be included. FIG. 8A shows a slightly modified spraying arrangement 76. As shown in FIG. 8A, the spraying arrangement 76 has two articulating arms 74 75, with one spray nozzle each 72 73 at the end to spray two separate pest target portions 202 of a building 200 (FIGS. 12, 14). This increases the amount of pest abatement material just as much as the model in FIG. 7 but additionally adds mobility to each individual arm. Two separate functioning articulate arms allows for spraying of multiple nests at once and from two separate positions. In some examples, all links (e.g. 72 *a*, 73 *a*, 74 *a*, 75 *a*) include electrical and/or mechanical connections and may in some cases include fluidic connections.

Figure 9:
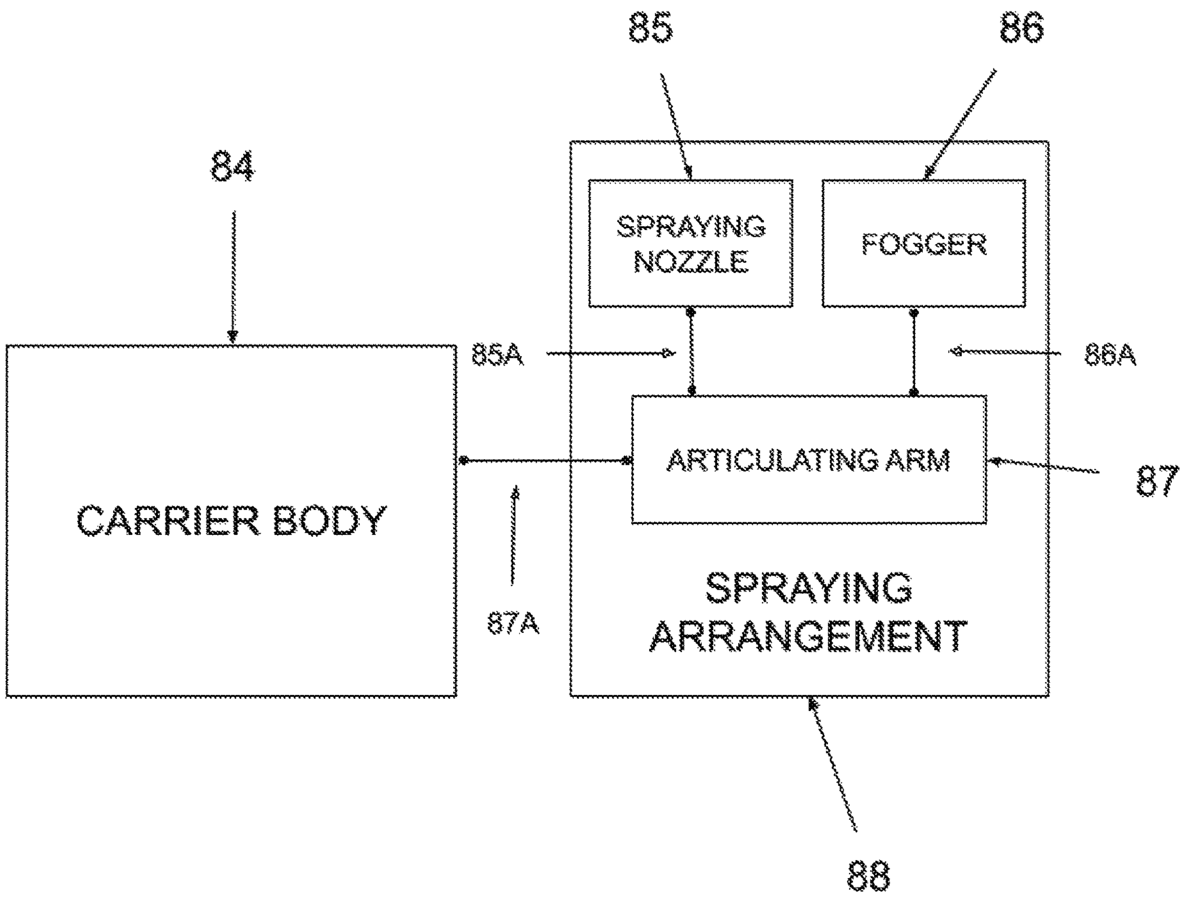
FIG. 9 is a block diagram schematically representing an example UAV pest abatement device including a spraying arrangement comprising a spraying nozzle and pest abating fogger fixed to an articulating arm.

FIG. 9 is a block diagram schematically illustrating a UAV pest abatement device for dispensing pest abatement material. FIG. 9 has a slight variation in the spraying arrangement 88 and includes a fogger 86 which is attached to the articulating arm 87. In some examples, all links (e.g.

72*a*, 73*a*, 74*a*, 75*a*) include electrical and/or mechanical connections and may in some cases include fluidic connections.

Figure 10:
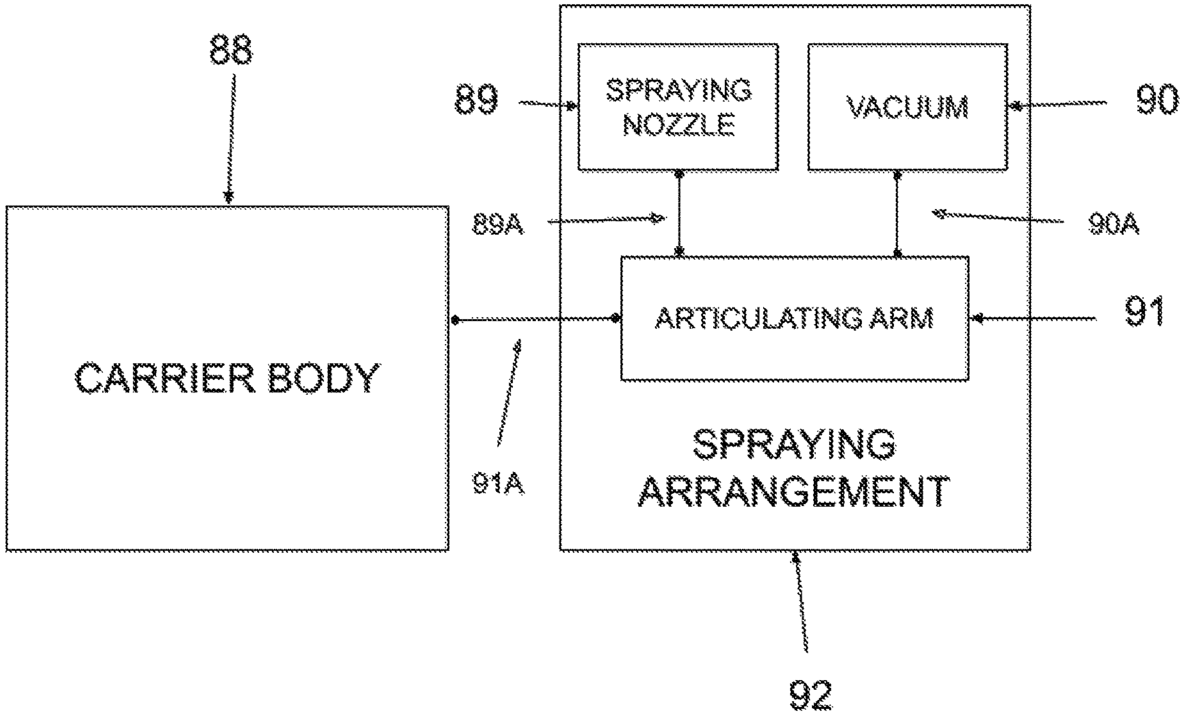
FIG. 10 is a block diagram schematically representing an example UAV pest abatement device including a spraying arrangement comprising a spraying nozzle and vacuum fixed to an articulating arm.

FIG. 10 is a block diagram schematically illustrating a UAV pest abatement device for dispensing pest abatement material. This block diagram does not show the reservoir and propulsion element in FIG. 11 as a way to simplify the illustration, but it will understood that such elements may be included. FIG. 10 has a unique attachment on the spraying arrangement 92. The spraying arrangement 92 includes a vacuum 90 with a negative pressure source and a control portion that can selectively regulate. A vacuum provides a non-lethal method of removing pests. In some examples, all links (e.g. 89*a*,90*a*,91*a*) include electrical and/or mechanical connections and may in some cases include fluidic connections.

Figure 11:
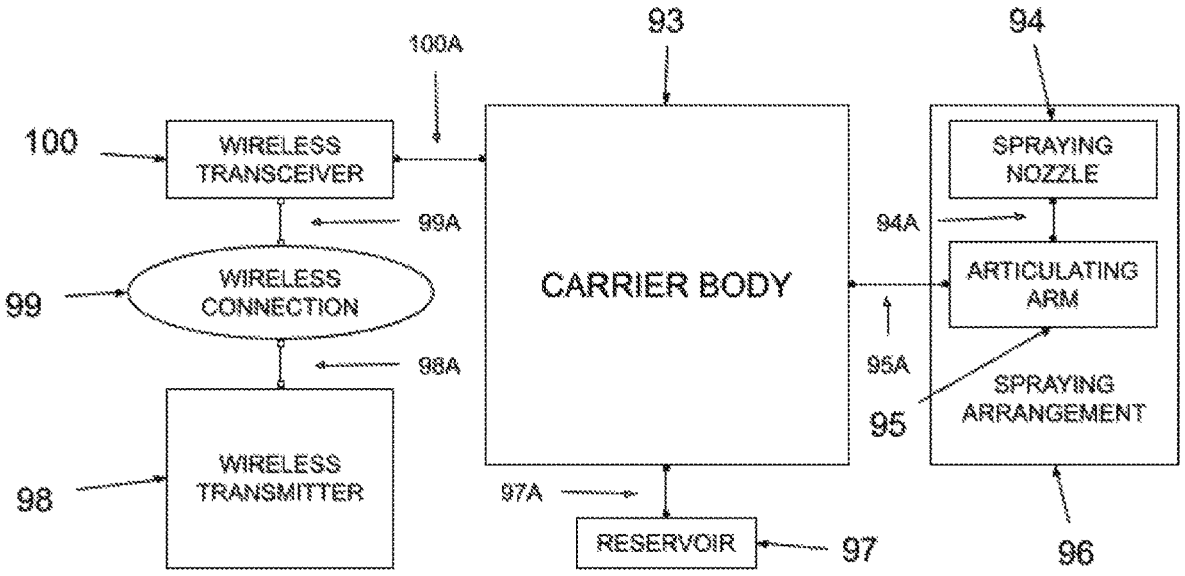
FIG. 11 is a block diagram schematically representing an example UAV pest abatement device including a drone-based wireless transceiver receiving a transmission from a wireless transmitter.

FIG. 11 is a block diagram schematically illustrating a UAV pest abatement device for dispensing pest abatement material. This block diagram does not show the propulsion element in FIG. 11 as a way to simplify the illustration, but it will be understood that such elements may be included. FIG. 11 shows the ability of a transmitter 98 to communicate through a wireless connection 99 with a transceiver 100 in order to operate the articulating arm 95 and the spray nozzle 94. In some examples, all links (e.g. 94*a*,95*a*,97*a*,98*a*,99*a*, 100*a*) include electrical and/or mechanical connections and may in some cases include fluidic connections.

FIG. 12 is a block diagram schematically illustrating a UAV pest abatement device for dispensing pest abatement material. FIG. 12 works as an example to show the capabilities of an extended articulating arm. Being able to adjust an articulating arms 106 size allows for spraying into hard to reach places. Extending the range allows spraying into deep crevices while lowering the range of the articulating arm allows spraying in tight corners. In some examples, the articulating behavior/structure shown in FIG. 12 may be implemented in any one of the examples described in association with at least FIGS. 1-11 and 13A-14.

In some examples, pest abatement for the UAV pest abatement device is provided by at least one material carrying conduit. The material carrying conduit is connected mechanically between the reservoir and the nozzle. The material carrying conduit transfers pest abatement materials from the reservoir and brings them to the nozzle to be sprayed. In some examples, the material carrying conduit may be implemented in any one of the examples described in association with at least FIGS. 1-11 and 13A-14, and may be omitted in at least some FIGs for illustrative simplicity.

Figure 13A:
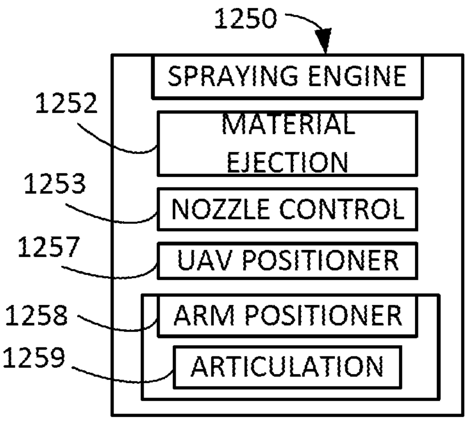
FIG. 13A is a block diagram of an example spraying engine.

FIG. 13A is a block diagram schematically representing an example spray control engine 1250. In some examples, the spray control engine 1250 may form part of a control portion 1500, as later described in association with at least FIG. 13B, such as but not limited to comprising at least part of the instructions 1511. In some examples, the spray control engine 1250 may be used to implement at least some of the various example devices and/or example methods of the present disclosure as previously described in association with FIGS. 1-12 and/or as later described in association with FIGS. 13B-14. In some examples, the spray control engine 1250 (FIG. 13A) and/or control portion 1500 (FIG. 13B) may form part of, and/or be in communication with, a spray control device.

In general terms, the spray control engine 1250 is to control at least some aspects of operation of the spray control devices and/or methods as described in association with at least FIGS. 1-13A and 13B-14.

As shown in FIG. 13A, the spray control engine 1250 may comprise a material ejection engine 1252, a nozzle selector-orientation engine 1257, a UAV flight positioner engine 1258, and/or an UAV arm positioner engine 1280.

In some examples, the material ejection engine 1252 controls operation of at least one spraying arrangements (including nozzles, reservoirs, etc.) as previously described to deposit abatement material onto target surfaces (e.g. at least FIG. 1) as described throughout the examples of the present disclosure.

In some examples, the nozzle selector-orientation engine 1257 is to control operation of a select which nozzles are to actively spray and/or the orientation of the each nozzle (or a selectable group of nozzles) at their target locations in an intended pattern, such as described in association with FIGS. 8-9 and/or various examples throughout the present disclosure.

In some examples, the spray control engine 1250 may comprise the UAV flight positioner engine 1280, which in general terms, is to control propulsion and/or steering of the UAV carrier body to fly in/through the air to position the UAV relative to a target structure, such as building, particular portion of building etc.

In some examples, the spray control engine 1250 may comprise a UAV arm positioner engine 1258 to control positioning of each arm individually, and/or in selective groups, to position the respective arms relative to a target structure/surface and/or relative to each other. As previously noted, in some examples, one or more arms may be controllable for a degree of orientation or articulation per perimeter 1259. In some examples, arm may move in a sweeping motion via such control.

It will be understood that, in at least some examples, the spray control engine 1250 is not strictly limited to the particular grouping of parameters, engines, functions, etc. as represented in FIG. 13A, such that the various parameters, engines, functions, etc. may operate according to different groupings than shown in FIG. 13A.

Figure 13B:
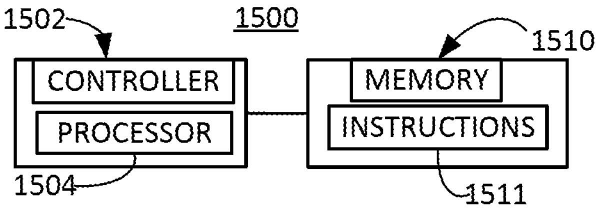
FIG. 13B is a block diagram of an example control portion.

FIG. 13B is a block diagram schematically representing an example control portion 1500. In some examples, control portion 1500 provides one example implementation of a control portion forming a part of, implementing, and/or generally managing the example spray control devices, as well as the particular portions, material ejection elements (e.g. spraying arrangement), UAV propulsion/steering elements, arm positioning elements, nozzle control elements, user interface, instructions, engines, parameters, functions, and/or methods, as described throughout examples of the present disclosure in association with FIGS. 1-13A and 13C-14. In some examples, control portion 1500 includes a controller 1502 and a memory 1510. In general terms, controller 1502 of control portion 1500 comprises at least one processor 1504 and associated memories. The controller 1502 is electrically couplable to, and in communication with, memory 1510 to generate control signals to direct operation of at least some the spray control devices, various portions and elements of the spray control devices, such as material abatement ejection elements/arrangements, UAV propulsion/steering elements, arm positioning elements, nozzle control elements, user interfaces, instructions, engines, parameters, functions, and/or methods, as described throughout examples of the present disclosure. In some examples, these generated control signals include, but are not limited to, employing instructions 1511 stored in memory 1510 to at least direct and manage depositing abatement material onto target surface, positioning a UAV relative to structure, positioning arms/nozzles, etc. as described throughout the examples of the present disclosure in association with FIGS. 1-13A and 13B-14. In some instances, the controller 1502 or control portion 1400 may sometimes be referred to as being programmed to perform the above-identified actions, functions, etc. In some examples, at least some of the stored instructions 1511 are implemented as a, or may be referred to as, a spray control engine, and the like, such as but not limited to the spray control engine 1250 in FIG. 13A.

In response to or based upon commands received via a user interface (e.g. user interface 1520 in FIG. 13C) and/or via machine readable instructions, controller 1502 generates control signals as described above in accordance with at least some of the examples of the present disclosure. In some examples, controller 1502 is embodied in a general purpose computing device while in some examples, controller 1502 is incorporated into or associated with at least some of the spray control devices, portions or elements along the travel path, material abatement ejection devices, UAV propulsion/steering elements, arm positioning elements, nozzle control elements, user interfaces, instructions, engines, functions, and/or methods, etc. as described throughout examples of the present disclosure.

For purposes of this application, in reference to the controller 1502, the term "processor" shall mean a presently developed or future developed processor (or processing resources) that executes machine readable instructions contained in a memory or that includes circuitry to perform computations. In some examples, execution of the machine readable instructions, such as those provided via memory 1510 of control portion 1400 cause the processor to perform the above-identified actions, such as operating controller 1502 to implement the UAV positioning, targeted spraying, vacuuming, etc. as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 1510. The machine readable instructions may include a sequence of instructions, a processor-executable machine learning model, or the like. In some examples, memory 1510 comprises a computer readable tangible medium providing non-volatile storage of the machine readable instructions executable by a process of controller 1502. In some examples, the computer readable tangible medium may sometimes be referred to as, and/or comprise at least a portion of, a computer program product. In other examples, hard wired circuitry may be used in place of or in combination with machine readable instructions to implement the functions described. For example, controller 1502 may be embodied as part of at least one application-specific integrated circuit (ASIC), at least one field-programmable gate array (FPGA), and/or the like. In at least some examples, the controller 1502 is not limited to any specific combination of hardware circuitry and machine readable instructions, nor limited to any particular source for the machine readable instructions executed by the controller 1502.

In some examples, control portion 1500 may be entirely implemented within or by a stand-alone device.

In some examples, the control portion 1500 may be partially implemented in one of the spray control devices and partially implemented in a computing resource separate from, and independent of, the spray control devices but in communication with the spray control devices. For instance, in some examples control portion 1500 may be implemented via a server accessible via the cloud and/or other network pathways. In some examples, the control portion 1500 may be distributed or apportioned among multiple devices or resources such as among a server, a spray control device, and/or a user interface.

Figure 13C:
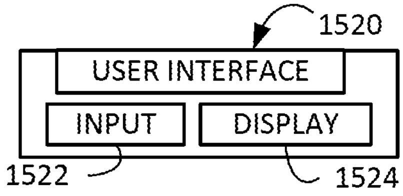
FIG. 13C is a block diagram of an example user interface.

In some examples, control portion 1500 includes, and/or is in communication with, a user interface 1520 as shown in FIG. 13C. In some examples, user interface 1520 comprises a user interface or other display that provides for the simultaneous display, activation, and/or operation of at least some of the spray control devices, portions thereof, elements, UAV propulsion/steering elements, material abatement ejection elements/arrangements, arm positioning elements, nozzle control elements, user interfaces, instructions, engines, functions, and/or methods, etc. as described in association with FIGS. 1-13B and 14. In some examples, at least some portions or aspects of the user interface 1520 are provided via a graphical user interface (GUI), and may comprise a display 1524 and input 1522.

FIG. 14 is a flow diagram schematically representing an example method 1600. In some examples, method 1600 may be performed via at least some of the same or substantially the same spray control devices, portions, material abatement ejection elements/arrangements, UAV propulsion/steering elements, arm positioning elements, nozzle control elements, elements, control portion, user interface, etc. as previously described in association with FIGS. 1-13C. In some examples, method 1600 may be performed via at least some of the same or substantially the same spray control devices, portions, material abatement ejection elements/arrangements, UAV propulsion/steering elements, arm positioning elements, nozzle control elements, elements, control portion, user interface, etc. other than those previously described in association with FIGS. 1-13C.

As shown at 1602 in FIG. 14, in some examples method 1600 may comprise arranging an UAV to include a carrier body, at least one propulsion element, and at least one spraying arrangement which includes an arm, nozzle, and a reservoir to hold pest abatement material. As shown at 1604 in FIG. 14, method 1600 may comprise maneuvering the UAV, via operation of the at least one propulsion element, into close proximity to a pest target portion (202 in FIGS. 8A, 12) of a building (200 in FIGS. 8A,12) and/or other structure.

As shown at 1606 in FIG. 14, method 1600 may comprise positioning the arm, extending from the carrier body and via at least one point of articulation of the arm, relative to a portion (e.g. 202 in FIGS. 8A, 12) of the building (200 in FIGS. 8A, 12) and/or structure to position a nozzle in close proximity to the pest target portion (202 in FIGS. 8A,12) to spray (e.g. eject) a pest abatement material from the reservoir. In some examples, method 1600 may further comprise various combinations of the example implementations previously described in association with at least FIGS. 1-13C.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A method comprising:

maneuvering an unmanned aerial vehicle through flight, via operation of at least one propulsion element, into close proximity to a pest target portion of a building, wherein the aerial vehicle comprises a carrier body, the at least one propulsion element, and at least one spraying arrangement, wherein the at least one spraying arrangement includes at least one arm with a nozzle and a reservoir to hold a pest abatement material with the reservoir being in communication with the nozzle;

visualizing, via a camera mounted on at least one of the carrier body or the at least one spraying arrangement, the pest target portion while illuminating the pest target portion via a light supported by the aerial vehicle; and positioning the at least one arm, via extension from the carrier body and via at least one point of articulation of the at least one arm, relative to the pest target portion of the building to position the nozzle in close proximity to the pest target portion to spray the pest abatement material from the reservoir at the pest target portion while visualizing the illuminated pest target portion, wherein the positioning includes:

articulating, via the at least one point of articulation along the at least one arm, the at least one arm into different positions to spray the pest target portion, wherein the at least one point of articulation comprises a first articulation point between opposite ends of the at least one arm; and removing, via the at least one propulsion element, a pest habitation from the pest target portion.

2. The method of claim 1, wherein the positioning the at least one arm comprises:

causing extension of the at least one arm into different extendible positions relative to the carrier body to move the at least one arm into different extended positions relative to the pest target portion.

3. The method of claim 1, comprising:

controlling, via at least one transmitter in communication with the aerial vehicle, the maneuvering, the positioning, and the spraying.

4. The method of claim 1, wherein the first articulation point is located towards a center of the at least one arm between the opposite ends of the at least one arm, wherein the opposite ends of the at least one arm comprise a first end at which the nozzle is attached relative to the at least one arm and a second end via which the at least one arm is connected relative to the carrier body.

5. The method of claim 4, wherein the at least one articulation point comprises a second articulation point at the connection of the second end of the at least one arm relative to the carrier body.

6. The method of claim 1, wherein the at least one arm comprises two arms.

7. The method of claim 1, wherein the camera comprises a thermal camera, and wherein visualizing via the pest target portion comprises:

identifying the pest target portion via visualizing at least one of pests and pest habitations with the thermal camera.

8. The method of claim 1, wherein the positioning the at least one arm, via extension from the carrier body and via the at least one point of articulation of the at least one arm, relative to the pest target portion of the building to position the nozzle in close proximity to the pest target portion comprises:

creating an equilibrium toward a center of the aerial vehicle via a counter-weighting distribution of a plurality of components of the aerial vehicle, wherein the plurality of components include the carrier body, the at least one propulsion element, and the at least one spraying arrangement, which includes the reservoir and at least one arm with the nozzle.

9. The method of claim 8, wherein at least one first component of the plurality of components is on an opposite side of the carrier body from at least one second component of the plurality of components.

10. The method of claim 1, comprising:

while implementing the positioning, vacuuming the respective pests at the pest target portion via the at least one arm.

11. A method comprising:

maneuvering an unmanned aerial vehicle through flight, via operation of at least one propulsion element, into close proximity to at least one pest target portion of a building, wherein the aerial vehicle comprises a carrier body, the at least one propulsion element, and at least one spraying arrangement, wherein the at least one spraying arrangement includes at least one arm with a nozzle and a reservoir to hold a pest abatement material with the reservoir being in communication with the nozzle, wherein the maneuvering comprises;

visualizing, via a camera mounted on at least one of the carrier body or the at least one spraying arrangement, the at least one pest target portion; and identifying at least one of pests or a pest habitation of the pest target portion, wherein the identifying comprises at least one of:

thermally identifying, via a thermal camera mounted on at least one of the carrier body or the at least one spraying measurement, the respective pests or pest habitation of the pest target portion; and illuminating, via a light mounted on the at least one of the carrier body or the at least one spaying arrangement, the pests or the pest habitation; and positioning the at least one arm, via extension from the carrier body and via at least one point of articulation of the at least one arm, relative to the pest target portion of the building to position the nozzle in close proximity to the pest target portion to spray the pest abatement material from the reservoir at the respective pests and pest habitation of the pest target portion while visualizing the pest target portion via the camera and while performing the thermal identification of the respective pests or pest habitation, wherein the positioning includes:

articulating, via the at least one point of articulation along the at least one arm, the at least one arm into different positions to spray the pest target portion, wherein the at least one point of articulation comprises a first articulation point between opposite ends of the at least one arm; and removing, via the at least one propulsion element, a pest habitation from the pest target portion.

12. The method of claim 11, wherein the at least one arm comprises two separate arms including a first arm and a second arm and wherein the at least one pest target portion comprises two separate pest target portions including a first pest target portion and a second pest target portion, and wherein the positioning comprises:

positioning the nozzle of the first arm into close proximity to the first pest target portion to spray the pest abatement material at the first target portion; and positioning, at the same time as the positioning of the nozzle of the first arm but separate from the positioning of the nozzle of the first arm, the nozzle of the second arm into close proximity to the second pest target portion to spray the pest abatement material at the second pest target portion.

13. The method of claim 11, comprising:

detecting, via an at least one of an ultrasonic sensor or a stereoscopic sensor, an environment around the aerial vehicle.

14. The method of claim 11, comprising:

illuminating the pest target portion via the light supported by the aerial vehicle.

15. The method of claim 11, wherein the positioning the at least one arm, via extension from the carrier body and via at least one point of articulation of the at least one arm, relative to the pest target portion of the building to position a nozzle in close proximity to the pest target portion comprises:

creating an equilibrium toward a center of the aerial vehicle via a counter-weighting distribution of a plurality of components of the aerial vehicle, wherein the plurality of components include the carrier body, the at least one propulsion element, and the at least one spraying arrangement which includes the reservoir and the at least one arm with the nozzle.

* * * * *